Patented Aug. 7, 1934

1,969,347

UNITED STATES PATENT OFFICE 1,969,347

CONVERSION OF STARCH

Hans F. Bauer, Chicago, Ill., assignor to Stein, Hall Manufacturing Company, Chicago, Ill., a corporation of Delaware No Drawing. Application July 24, 1931, Serial No. 552,996

19 Claims. (Cl. 127—32)

This invention relates broadly to the manufacture of commercial dextrin mono-saccharoses such as glucose and adhesive products, from flour as distinguished from starch.

It should be understood that the term commercial dextrin does not necessarily mean chemically pure dextrin—but is a term generally used to designate the mixture of starch, starch isomerides, and reducing sugars along with smaller amount of other substances—that is obtained by breaking or partially breaking down or hydrolyzing starch or flour of high starch content by means of heat, acids, acid salts, enzymes, combinations of these means or other catalysts.

Ordinarily the dry commercial dextrins or British gums are made by roasting substantially pure starch, either with or without smaller amounts of acid or other catalysts, until a product of the desired color, solubility, viscosity and other physical characteristics is obtained.

The wet converted liquid dextrins and dextrin pastes are usually made by cooking starch with water and a small amount of some acid or other catalyst, or else by treating gelatinized starch with some enzyme, such as malt diastase or other catalyst.

As I understand it, the hydrolysis of starch is a catalytic reaction and I use the words catalytic and catalytic reaction and catalyzer in the following description in their broadest sense.

The common practice of adding acid or other catalyst to starch is in water solution or suspension. When moisture is added to flour ordinarily a tough elastic dough or gel forms which more or less completely envelops either the entire mass or part of the mass. This forms a heterogeneous product preventing the intimate and uniform distribution of the ingredients, thus interfering with the conversion reaction.

Heretofore it has been impossible to satisfactorily dextrinize vegetable and grain flours without first removing the proteins, fibre and fats naturally present in these flours, due to the fact that these substances interfere with proper conversion of the starch into dextrins or other conversion products.

The main objects of this invention are to provide an improved process for dextrinizing flours, or otherwise modifying their starch content, adapted to render it unnecessary to first remove the proteins, fibre or fats from the flour, and to produce an improved dextrin or other converted product containing the modified or unmodified proteins, and the other incidental ingredients of flour.

My invention consists substantially of treating vegetable or grain flours in such manner that the protein, fat, fibre and other impurities present do not interfere with the usual process of dextrinization or other conversion, such as by hydrolysis of the starch present in the flours, either simultaneously or subsequently. I have found that prevention of interference by materials other than starch in the process of dextrinizing or otherwise converting the starch is accomplished by any one of the following methods:

First, by mixing with the flour chemical or chemicals which have a liquefying or degelling action on certain of the components of the flour, preventing the formation of dough or gel when in the presence of moisture, such as sulphur dioxide, sulphite salts, urea or other compounds having substantially similar characteristics.

A most striking illustration of this liquefying or degelling effect is seen when, for example, to fifty pounds of flour fifty pounds of water are added and the mass is worked into a stiff dough; then add to this dough a quarter of a pound of sodium bisulphite and work it into the dough. After a short time the dough character of the mass is completely lost—the whole seeming to liquefy.

Second, by adding to the flour the acid or other catalyzer, dry, that is, without water. This can be accomplished by:

A.—Adding to the flour catalyzer in a carrier, such as a commercially pure starch, dextrin, or dextrin made by my process, or the like.

B.—Adding a dry catalyzer, such as aluminum chloride, or hydrogen chloride gas.

C.—Adding catalyzer in a solvent in which the catalyzer is soluble but will not be absorbed by, and is not soluble in the protein, fat, fibre and other impurities present in the flour.

Third, by combining any of the above methods and dextrinizing or further converting or hydrolyzing the starch present.

By the use of my invention it is possible to make a good commercial dextrin directly from various flours, containing substantial quantities of protein and other incidental ingredients, whereas heretofore it has been considered necessary to use substantially pure starch.

The final product obtained by my process may contain a certain amount of gluten or modified gluten or proteins in addition to dextrin, starch gums and sugar in proportions depending on the conversion or hydrolysis of the starch present. Experience has proved that the presence of this material with the dextrins, gums or sugars is not detrimental, since it has adhesive properties in itself which supplement those of the dextrin. In fact, it gives rise to certain physical properties which render the product for many purposes much superior to commercial dextrin and gum mixture made from starch.

I have found this product very suitable for most purposes for which commercial dextrin is used; some of the more notable examples being bakers' dextrin, linoleum cements, carton sealing glues, core binders, textile sizes and paper sizes, bag pastes, and adhesives.

If desired the conversion may be carried to such a degree that a compound substantially similar to commercial glucose is formed. This product may be utilized by the trade in combination with modified or unmodified protein matter present or a separation may be made.

A general procedure in which the principles of my invention would be employed to manufacture a dry commercial dextrin for example directly from flour, such as wheat, corn, rye, pea, rice flour, etc., might be as follows:

First, a small amount of powdered sodium bisulphite is blended with the flour; then, depending on the type of product desired, a suitable acid or acid salt is introduced into the blend in excess of the suitable amount to interact with the sodium bisulphite, the excess acting as a catalyzer. The addition of acid, however, is not essential for some products. When this has been accomplished, the mixture is heated in pans, steam-jacketed drums, or some other form of roasting device. The acid and or heat breaks down the sulphite salt or sulphurous acid and liberates sulphur dioxide, which latter renders inert the proteins, fibre, and fats present in the flour, preventing the formation of dough or gel, so that there is no interference with the subsequent conversion of the starch into dextrin.

In the case of manufacturing a liquid commercial dextrin, dextrin paste or sugar such as glucose, directly from flours by means of a wet conversion process, a general procedure making use of my invention would be as follows:

The dry flour, or a flour and water mixture, is first treated with sulphur dioxide or a sulphite salt in such a way as to render inert the proteins, fibre and fat, preventing the formation of a dough or gel, and then this treated flour is converted in the wet by means of heat, acids, acid salts, enzymes or other catalysts, or combinations of these means, into a product of the desired characteristics.

It should be understood that the two general methods of procedure, given above to illustrate the application of my invention in the manufacture of commercial dextrin directly from vegetable or grain flours by either wet or dry processes, are only typical examples showing ways in which my invention can be applied, and do not necessarily limit its scope to these particular examples. Examples of my other treatment follow:

As an example of my A treatment a quantity of starch is treated with HCL and is allowed to dry. This is then added to the required quantity of flour, the whole being intimately mixed and roasted, the starch being dextrinized in the usual way.

As an example of my B treatment to the flour, the starch of which is to be dextrinized or otherwise converted, the required quantity of hydrogen chloride or aluminum chloride is added, the whole being intimately mixed, roasted and converted in the usual way.

As an example of my C treatment—to the flour the starch of which is to be converted is added a required amount of anhydrous aluminum chloride dissolved in carbon tetrachloride, the whole being intimately mixed, roasted and converted in the usual way. Alcohol acidulated with HCL can replace the aluminum chloride carbon tetrachloride solution in this method.

As a specific illustration of the application of my invention, I give the following description of an actual conversion using wheat flour:

I place, for instance, 1000 pounds of wheat flour in a converting drum and add three pounds of powdered sodium bisulphite, and agitate it until it is thoroughly distributed throughout the flour. Then I add 200 pounds of corn starch, which has been acidified with 12,000 cc. of 10.8° Baumé hydrochloric acid. After this has been blended in, I turn on the heat and roast the mixture for about five hours at a temperature of about 300° F.

By this time the product will have assumed a yellow-brown color and is very similar in appearance to ordinary high soluble yellow dextrin. As soon as control tests show that the product has reached the desired solubility, viscosity and color (in this particular case 90% soluble in cold water) it is drawn off and cooled by some method, as mixing it in a cold water jacketed cooling mixer, or by running it through several lengths of conveyor open to the cooling effect of the air. The cooled product is then screened to remove any lumps and foreign particles, and then run into bags or containers.

In this particular case, the final product is of a light yellowish-brown color, and is about 90% soluble in cold water. When cooked up, one part by weight with one part by weight of water, it gives a syrupy brown solution which has very good adhesive properties.

It is to be noted in this case the hydrochloric acid was not sprayed directly into flour, but instead was mixed with 200 pounds of powdered corn starch which in turn was mixed with the flour. Instead of using a straight starch as a carrier to introduce the acid, a portion of the flour, previously treated with sulphur dioxide to render the gluten inert, could be used, so as to prevent its interference with the starch conversion.

The addition of a small quantity of the finished product to any flour tends to modify the protein content of the flour, materially reducing the amount of SO$_2$ required.

Another way of acidifying the flour would be to introduce the acid in the form of hydrochloric acid gas or to mix an acid salt such as aluminum chloride with the flour, and by heating release hydrochloric acid fumes.

Substantially the same final product may be obtained when the flour is treated by introducing catalyzer dry or in other than water solution, or when distributed in a carrier which will keep the catalyzer more or less dry and protect it from absorption, because of dough or gel formation, or other interaction.

There are several important factors which will influence the characteristics of the final product:

(1) The amount of sulphur dioxide used in breaking down the proteins.

(2) The amount and the kind of acid or other catalyst used to convert the starch. (In this particular example we used hydrochloric acid, but if desired, a number of other acids or acid salts or mixtures of them may be used, a few typical ones being nitric acid, acetic acid and formic acid);

(3) The length of time the flour is converted.

(4) The temperature at which the flour is converted.

(5) The type or kind of flour that is being converted.

(6) The neutralizing agents used during or at the end of the conversion, if one is used.

By changing or varying any or all of these influencing factors, the manufacturer can obtain any final product desired, varying from one that mixes with water to form a heavy white paste to a product of the nature of commercial glucose which may or may not be separated from the protein matter present.

In general, when I use the term "dry or substantially dry" in connection with the description of this invention and the claims, I mean to refer to a condition in which the flour or cereal mass is not in a water liquid state. Flour, of course, may normally have in it a small percentage of moisture. Furthermore, flour will absorb upwards from 55-70% moisture with a change towards a rather stiff dough which, however, is ordinarily dry to the feel or touch. After the maximum water absorption point of the flour is passed, the gel breaks down and a flowing or viscous, wet state prevails and the flour is no longer considered in a substantially dry condition.

Preferably in carrying out my process, I operate with a percentage of water well below the maximum absorption point of the flour. Even such lower percentages of moisture cause the same gelling action of minute particles and have the same deterrent effect upon the action of the starch conversion agent. In my use of the term "dry", therefore, I mean to refer to any conditions of flour or cereal below that condition in which sufficient water is present to have the flour or cereal mass in a water liquid state or any point below the maximum absorption point of the flour or cereal under treatment.

Although the foregoing description in many respects is specific, still it is to be understood that my intention is to protect this invention as broadly as consistent with the prior art and a reasonable interpretation of the terms and spirit of the following claims.

What I claim is:

1. The method of converting starch in flour having starchy and non-starchy components in a relatively dry state, which comprises adding a non-starchy component gel inhibiting agent and a starch conversion agent to the flour.

2. The method of converting starch in flour in a relatively dry state, which comprises treating the flour with sulphur dioxide whereby the natural proteins and fats present in the flour are rendered inert and converting the starch present in the flour by means of a starch conversion agent.

3. The method of converting starch in flours in a relatively dry state, which comprises treating the flour with sulphite salts, whereby the natural proteins and fats present in the flour are rendered inert and converting the starch present in the flour by means of a suitable starch conversion agent.

4. The method of obtaining a starch conversion product directly from flour in a relatively dry state comprising blending sodium bisulphite with the flour to facilitate the conversion of the starch present and heating the resulting mixture whereby conversion is obtained.

5. The method of producing a converted starch from flour comprising the steps of blending a small percentage of a sulphite salt with said flour in a relatively dry state and then roasting the mixture.

6. The method of producing a converted starch product directly from flour, which comprises treating the flour in a relatively dry state with sulphur dioxide to facilitate the converting action of the starch to be converted and heating the treated flour whereby conversion is obtained.

7. The method of producing a converted starch product directly from flour, which comprises treating the flour in a relatively dry state with sulphur dioxide to facilitate the action of a starch conversion agent upon the starch present and heating the treated flour whereby conversion is obtained.

8. The method of producing a starch conversion product directly from flour, which comprises the step of treating the flour in a relatively dry state with a sulphite salt and heating.

9. The method of converting starch in flour, which comprises the steps of blending a sulphite salt with flour in a relatively dry state and then heating the mixture.

10. The method of converting starch in flour which comprises the steps of blending a sulphite salt with flour in a relatively dry state, and heating with a starch conversion agent.

11. The method of converting starch in flour which includes the steps of blending sodium bisulphite with flour in a relatively dry state in a converter and roasting to a degree sufficient to obtain conversion.

12. The method of converting starch in flour which comprises the steps of blending a sulphite salt with the flour in a relatively dry state in the presence of a starch conversion agent, and roasting to a degree sufficient to obtain conversion.

13. A dry converted non-gelatinized product from flour comprising converted flour starch, said flour being converted substantially in the dry and having therein all of the natural elements of the flour, and modified components, and containing less than 10% by weight of reducing sugars.

14. A dry converted non-gelatinized product made from starch-containing flours, said flour having been converted substantially in the dry, comprising converted starch and the naturally incidental co-ingredients derived from the flour including modified components and containing less than 10% by weight of reducing sugars.

15. A dry converted non-gelatinized product from starch containing flour comprising converted flour starch, said flour having been converted substantially in the dry, and the naturally incidental co-ingredients including modified or unmodified protein, fat and fibre and containing less than 10% by weight of reducing sugars.

16. The method of producing substantially dry commercial dextrin from flour in which a gel problem exists which comprises adding in a dry state a substance to inhibit the formation of a dough or gel and adding a starch conversion agent.

17. The method of converting starchy components in the presence of non-starchy components in flour in which a gel problem exists substantially in the dry which comprises the steps of blending a non-starchy component degelling agent with the flour and heating the resulting mixture.

18. A dry converted non-gelatinized product from flour comprising converted flour starch and acid modified non-starchy components, said product having therein substantially all of the natural elements of the flour.

19. A dry converted non-gelatinized product from flour comprising converted flour starch and acid modified non-starchy components, said product having therein substantially all of the natural elements of the flour and containing less than 10% by weight of reducing sugars.

HANS F. BAUER.